(12) United States Patent
Čretnik et al.

(10) Patent No.: US 12,491,995 B2
(45) Date of Patent: Dec. 9, 2025

(54) VERTICAL TAKEOFF AND LANDING AIRCRAFT

(71) Applicant: Pipistrel d.o.o., Ajdovščina (SI)

(72) Inventors: Gregor Čretnik, Ljubljana (SI); David Eržen, Ljubljana (SI); Rok Lapuh, Ljubljana (SI); Andres Žnidar, Vrhnika (SI); Tine Tomažič, Vrhnika (SI); Blaž Močan, Ljubljana (SI); Jernej Drofelnik, Ljubljana (SI); Jernej Pirnar, Tržič (SI); Tadej Kosel, Komenda (SI); Antonio Righetti, Farra d'Isonzo (IT); Thomas Koopman, Ljubljana (SI); Matej Andrejašič, Postojna (SI)

(73) Assignee: Pipistrel d.o.o., Ajdovscina (SI)

( * ) Notice: Subject to any disclaimer, the term of this patent is extended or adjusted under 35 U.S.C. 154(b) by 12 days.

(21) Appl. No.: 18/440,931

(22) Filed: Feb. 13, 2024

(65) Prior Publication Data
US 2025/0256841 A1   Aug. 14, 2025

(51) Int. Cl.
*B64C 29/00*   (2006.01)

(52) U.S. Cl.
CPC .............................. *B64C 29/0025* (2013.01)

(58) Field of Classification Search
CPC ............ B64C 29/0025; B64C 29/0008; B64C 29/0005; B64U 10/20
See application file for complete search history.

(56) References Cited

U.S. PATENT DOCUMENTS

| | | | |
|---|---|---|---|
| 10,035,587 B2 | 7/2018 | Bevirt et al. | |
| 10,071,801 B2 | 9/2018 | North et al. | |
| 10,322,814 B1* | 6/2019 | Tian | B64C 29/0025 |
| 10,676,188 B2 | 6/2020 | Campbell | |
| 10,967,984 B2 | 4/2021 | Willford et al. | |
| 10,974,827 B2 | 4/2021 | Bevirt et al. | |
| 11,066,159 B2 | 7/2021 | Karem et al. | |
| 11,485,488 B1* | 11/2022 | Armer | B64C 29/0033 |
| 11,535,366 B2* | 12/2022 | Thalheimer | B64C 27/20 |
| 12,269,585 B2* | 4/2025 | Parks | B64C 39/08 |
| 2019/0127056 A1 | 5/2019 | Weekes et al. | |
| 2020/0277045 A1 | 9/2020 | Parks et al. | |

(Continued)

FOREIGN PATENT DOCUMENTS

| | | |
|---|---|---|
| CN | 212797340 U | 3/2021 |
| CN | 114013641 A | 2/2022 |

OTHER PUBLICATIONS

Extended European Search Report issued May 16, 2025 in EP Application No. 25157057.8, 10 pages.

*Primary Examiner* — Nicholas McFall
(74) *Attorney, Agent, or Firm* — Avek IP, LLC

(57) ABSTRACT

A vertical takeoff and landing (VTOL) aircraft includes a maximum takeoff weight (MTOW) of about 1700-kg, a cruising speed of about 80-knots equivalent airspeed (EAS) to about 100-knots EAS, a nominal range of about 300-km, a nominal flight time of about 4-hours, and at least one pair of rotors configured to provide vertical thrust. Each rotor of the at least one pair includes an about 2-meter propeller diameter, a disk loading of about 67-kg/m$^2$ to about 110-kg/m$^2$, and an operating speed of about 1800 rotations-per-minute (RPM) to about 2700-RPM.

16 Claims, 6 Drawing Sheets

(56) References Cited

U.S. PATENT DOCUMENTS

| | | |
|---|---|---|
| 2021/0001979 A1* | 1/2021 | Mikic ................. B64C 29/0016 |
| 2021/0300527 A1 | 9/2021 | Thalheimer |
| 2022/0234728 A1 | 7/2022 | Groninga et al. |
| 2023/0242283 A1 | 8/2023 | Tian |
| 2025/0011006 A1* | 1/2025 | Habib .................... B64F 1/322 |

* cited by examiner

VERTICAL TAKEOFF AND LANDING AIRCRAFT

BACKGROUND

1. Field

Embodiments of the invention relate generally to vertical takeoff and landing (VTOL) aircraft, and more specifically to a mid-range aircraft for transporting cargo with electrically powered takeoff and landing and combustion engine powered forward propulsion.

2. Description of the Related Art

Many types of VTOL electric aircraft are known. U.S. Pat. No. 10,035,587 to Bevirt et al. describes a VTOL tri-rotor aircraft with two rotors mounted on forward wing tips, and the three rotors may be powered by electric motors. U.S. Pat. No. 10,974,827 to Bevirt et al. describes a tri-rotor VTOL aircraft, and the rotors may be powered by electric motors. U.S. Pat. No. 10,071,801 to North et al. describes a tri-rotor VTOL aircraft, and the three rotors may be powered by electric motors. U.S. Pat. No. 10,676,188 to Campbell et al. describes a tilt-rotor aircraft with two forward rotors and one aft rotor, and the three rotors may be powered by electric motors.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a vertical takeoff and landing (VTOL) aircraft includes a maximum takeoff weight (MTOW) of about 1700-kg, a cruising speed of about 80-knots equivalent airspeed (EAS) to about 100-knots EAS, a nominal range of about 300-km, a nominal flight time of about 4-hours, and at least one pair of rotors configured to provide vertical thrust. Each rotor of the at least one pair includes an about 2-meter propeller diameter, a disk loading of about 67-kg/m$^2$ to about 110-kg/m$^2$, and an operating speed of about 1800 rotations-per-minute (RPM) to about 2700-RPM.

In an embodiment, a method of operating a vertical takeoff and landing (VTOL) aircraft includes: providing vertical thrust during lift off with at least one pair of rotors, including: rotating the at least one pair of rotors at a speed of about 1800 rotations-per-minute (RPM) to about 2700-RPM, and operating the at least one pair of rotors with a disk loading of about 67-kg/m$^2$ to about 110-kg/m$^2$. The method further includes lifting off with a takeoff weight less than a maximum takeoff weight (MTOW) of about 1700-kg, and cruising with a speed of about 80-knots equivalent airspeed (EAS) to about 100-knots EAS.

BRIEF DESCRIPTION OF THE DRAWING FIGURES

Embodiments of the invention are described in detail below with reference to the attached drawing figures, wherein.

Figure 1:
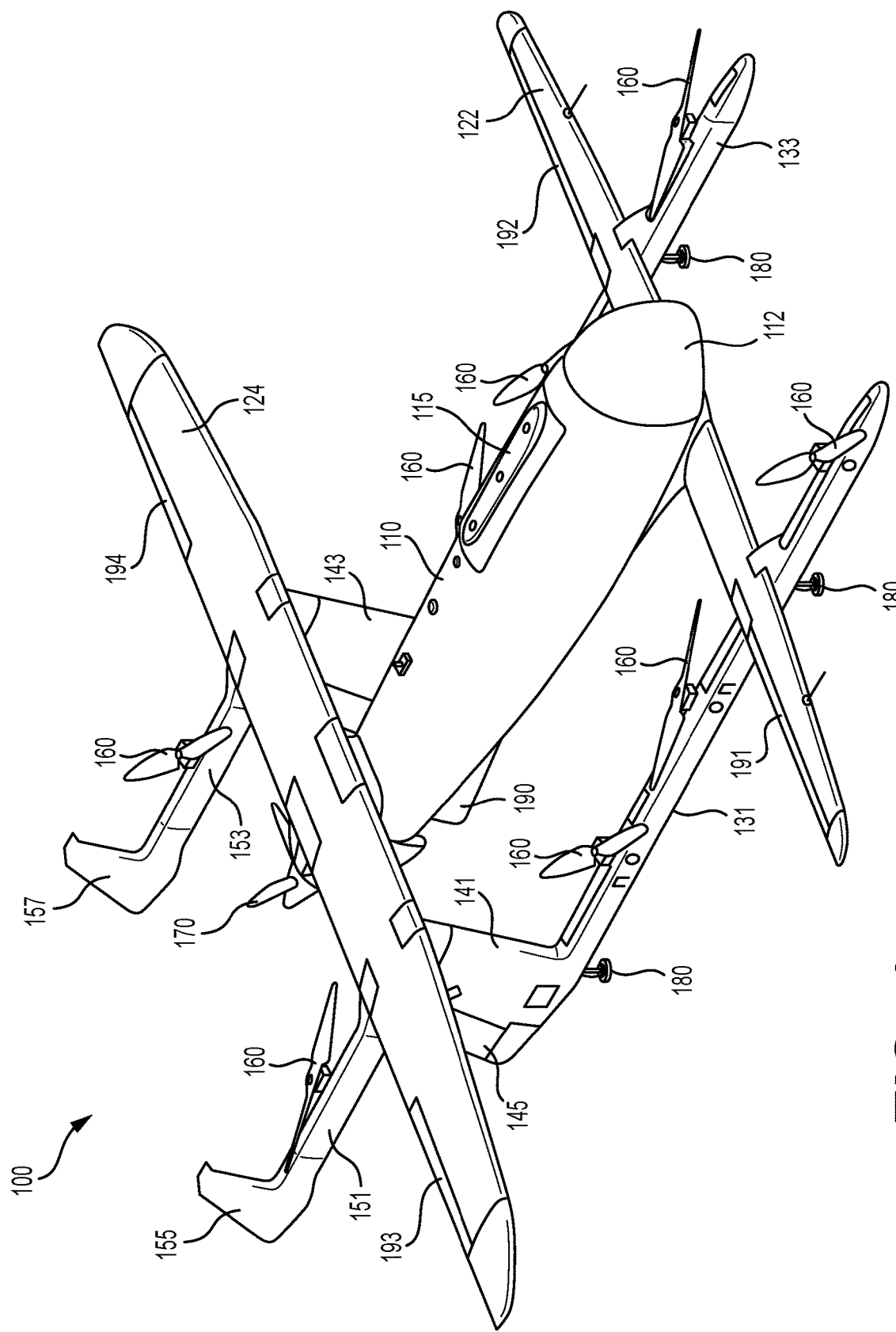
FIG. 1 is a perspective view of an embodiment of a VTOL aircraft.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
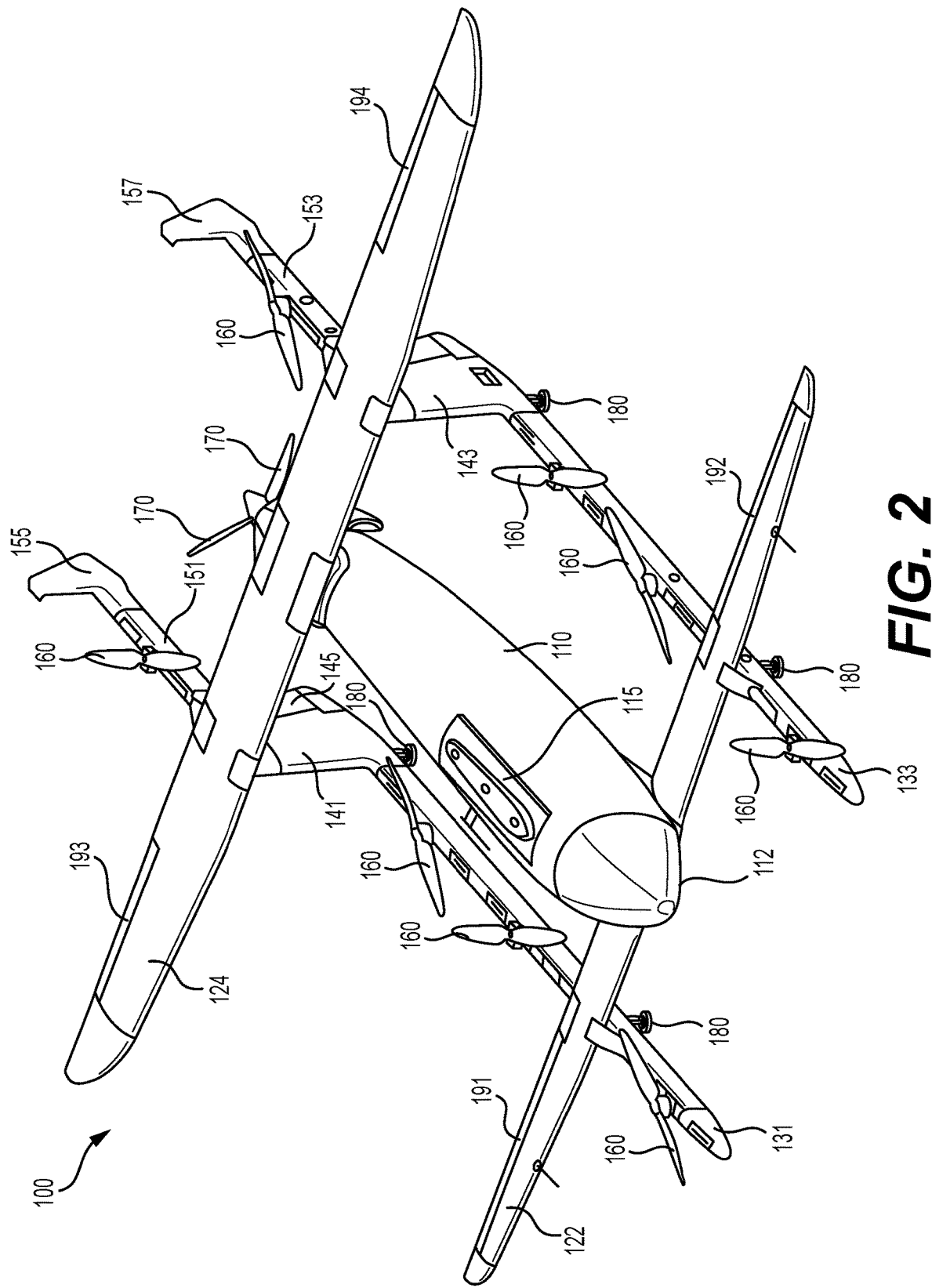
FIG. 2 is another perspective view of the VTOL aircraft of FIG. 1.
Figure 3:
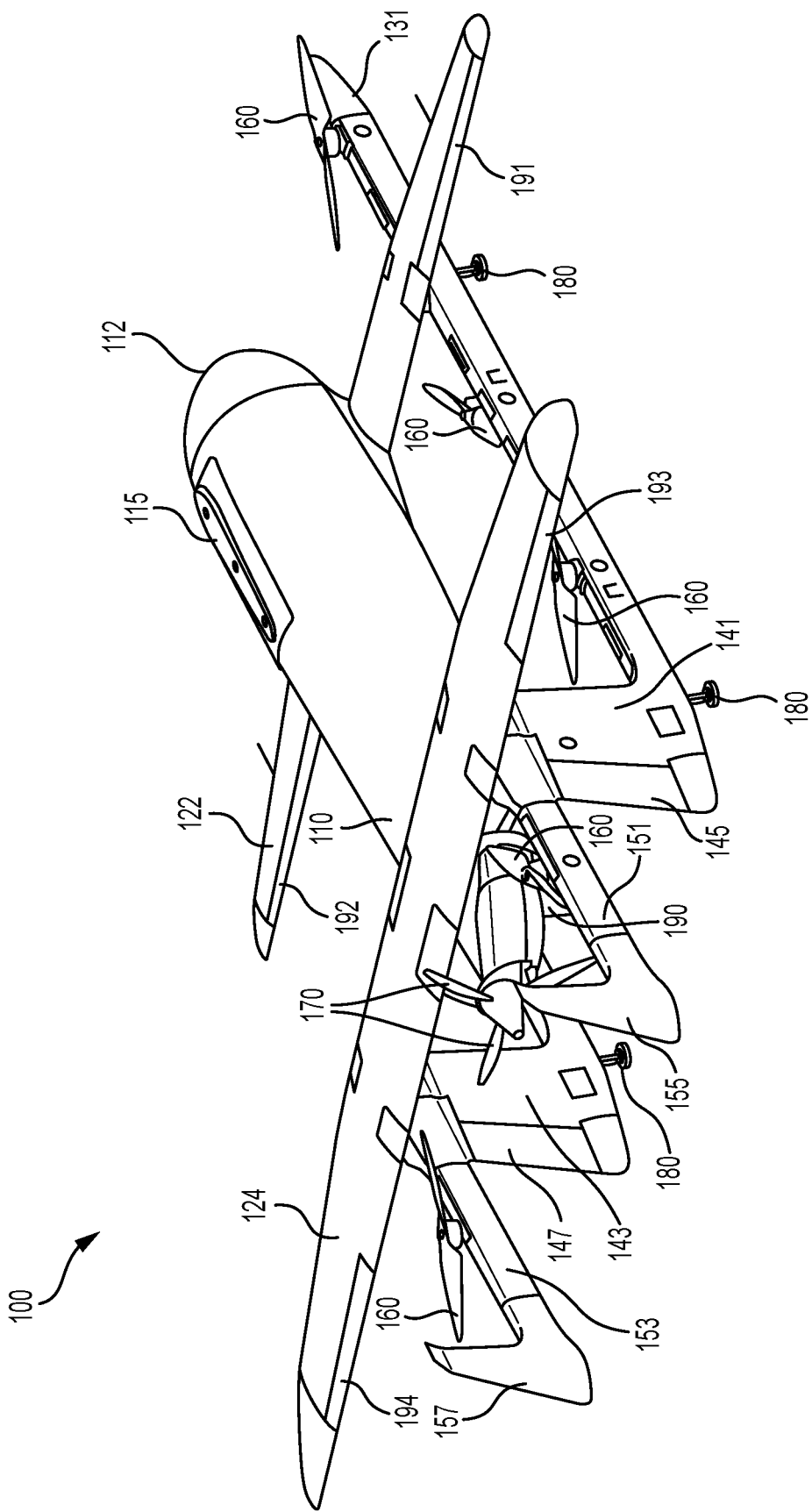
FIG. 3 is a rear perspective view of the VTOL aircraft of FIG. 1.
Figure 4:
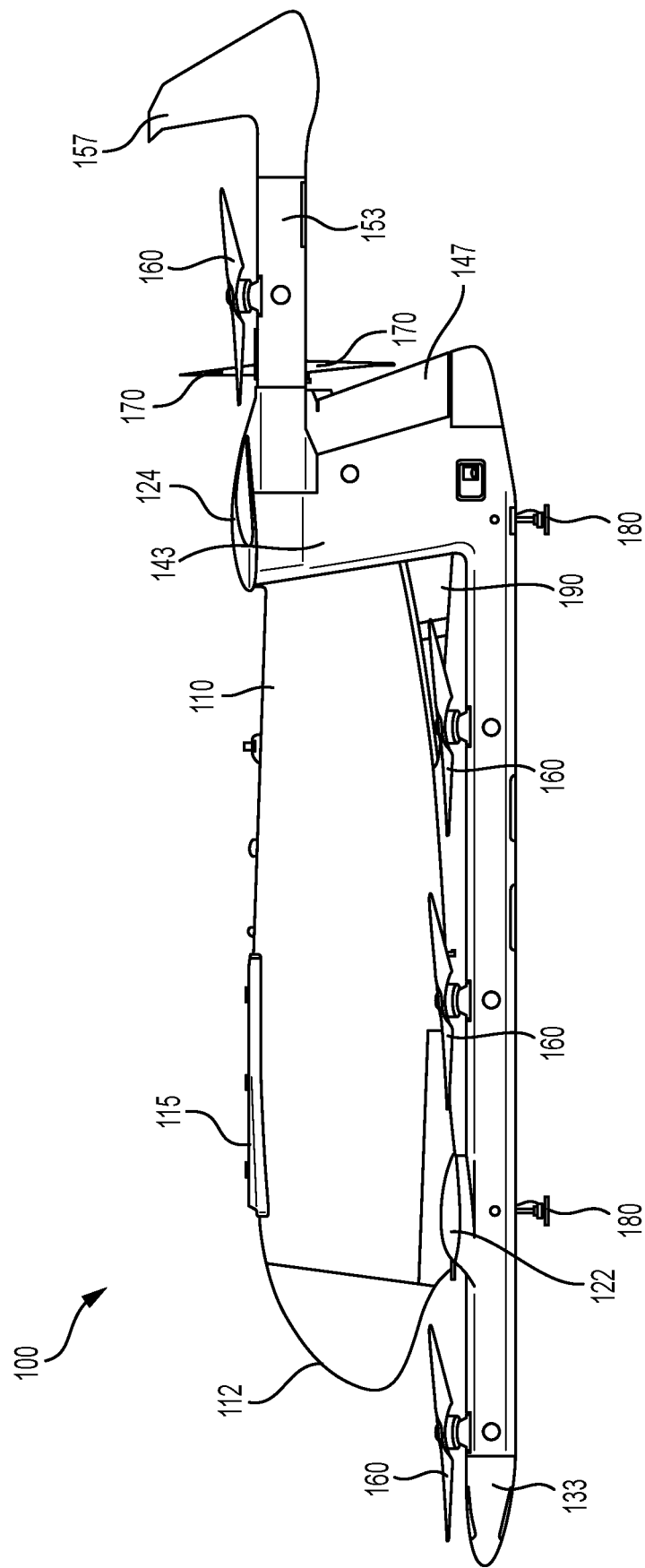
FIG. 4 is a first side view of the VTOL aircraft of FIG. 1.
Figure 5:
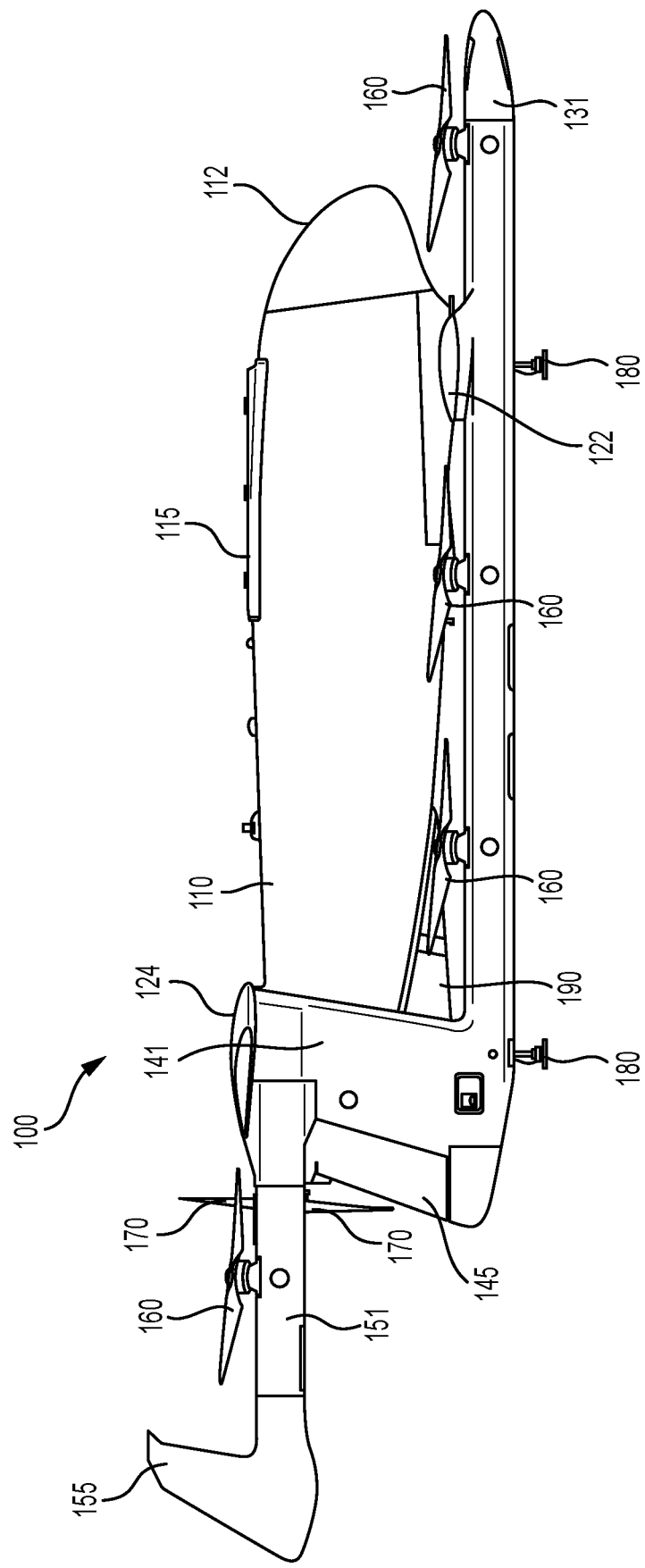
FIG. 5 is a second side view opposite the first side of the VTOL aircraft of FIG. 1.
Figure 6:
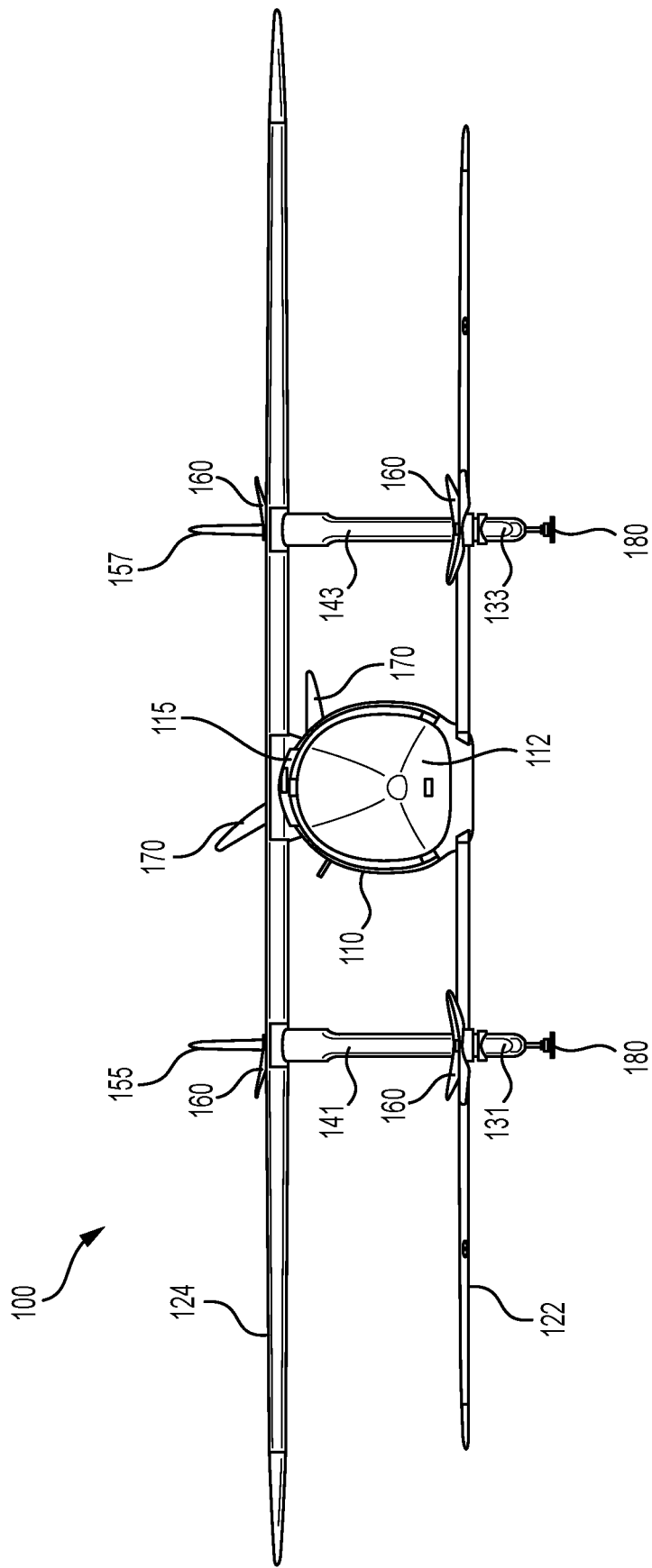
FIG. 6 is a front view of the VTOL aircraft of FIG. 1.

FIGS. 1-6 provide various views of a VTOL aircraft 100. Aircraft 100 has vertical takeoff and landing capabilities that are powered by electrically driven rotors 160. During forward flight, the aircraft is propelled by a pusher propeller 170 that is powered by a combustion engine, and the rotors 160 may be locked while not being used during forward flight. FIGS. 1-6 are best viewed together with the following description.

A fuselage 110 is aligned lengthwise in a longitudinal direction. A nose cone 112 covers a forward end of the fuselage 110. In embodiments, nose cone 112 is configured as a door that swings open/closed for enabling loading/unloading of cargo. A housing 115 is shown disposed on a top side of the fuselage 110; however, housing 115 may alternatively be disposed on an underside of the fuselage 110 without departing from the scope hereof. Housing 115 may be configured to house antenna (e.g., one or more GPS antennas) and affiliated equipment.

A forward wing 122 extends in a lateral direction from both sides of the fuselage. As shown in FIGS. 1-6, forward wing 122 is configured as a lower wing across or below a lower portion of the fuselage. Forward wing 122 comprises a slight taper with the leading edge being slightly swept and the trailing edge being unswept (i.e., straight) such that forward wing 122 is narrower at an outboard tip of the wing compared to an inboard portion adjacent the fuselage 110. As best viewed in FIG. 6, forward wing 122 lacks any dihedral angle either upwards or downwards (i.e., forward wing 122 when unloaded extends substantially horizontally from the fuselage 110). In embodiments, forward wing 122 is configured to provide a wing loading of about 44-kg/m² to about 68-kg/m² during level-steady flight.

An aft wing 124 extends in a lateral direction from both sides of the fuselage. As shown in FIGS. 1-6, aft wing 124 is configured as an upper wing across or above an upper portion of the fuselage. The leading edge of aft wing 124 comprises a curvature that provides a slight sweep and taper, while the trailing edge is unswept (i.e., straight), such that aft wing 124 is narrower at an outboard tip of the wing compared to an inboard portion adjacent the fuselage 110. As best viewed in FIG. 6, aft wing 124 lacks any dihedral angle either upwards or downwards (i.e., aft wing 124 when unloaded extends substantially horizontally from the fuselage 110). In embodiments, aft wing 124 is configured to provide a wing loading of about 48-kg/m² to about 70-kg/m² during level-steady flight. In certain embodiments, aft wing 124 provides a wing loading of about 59.1 kg/m².

A right longitudinal boom 131 extends longitudinally on the right side of the aircraft 100 and a left longitudinal boom 133 extends longitudinally on the left side. The longitudinal booms 131, 133 are disposed beneath the forward wing 122 and outboard of the fuselage 110. A right tail 141 extends substantially vertically from right longitudinal boom 131 to aft wing 124. A right rudder 145 is supported by and operatively coupled to the right tail 141. Similarly on the opposite side, a left tail 143 extends substantially vertically from left longitudinal boom 133 to aft wing 124, and a left rudder 147 is supported by and operatively coupled to the left tail 143 (see FIGS. 3 and 4). Right rudder 145 and left rudder 147 are configured to provide directional control of aircraft 100. In embodiments, additional rudder surfaces may be provided for directional control without departing from the scope hereof. The left and right longitudinal booms 131, 133 extend forward of forward wing 122 to aft wing 124 in the longitudinal direction (see FIG. 3).

A right aft boom 151 extends aft of the aft wing 124 in the longitudinal direction on the right side of the aircraft 100. A right aft tail stabilizer 155 forms the tail end of right aft boom 151 and extends upwards above the right aft boom 151. Similarly, a left aft boom 153 extends aft of the aft wing 124 in the longitudinal direction on the left side of the aircraft 100. A left aft tail stabilizer 157 forms the tail end of left aft boom 153 and extends upwards above the left aft boom 153.

In embodiments, right longitudinal boom 131, right tail 141, right aft boom 151, and right aft tail stabilizer 155 are constructed as a single member. Similarly, left longitudinal boom 133, left tail 143, left aft boom 153, and left aft tail stabilizer 157 may be constructed as a single member.

In embodiments, aircraft 100 includes eight electrically driven rotors 160 arranged in four left-right pairs. However, fewer or greater than eight rotors 160 may be employed on aircraft 100 without departing from the scope hereof. As shown in FIGS. 1-6, three of the left-right pairs of rotors 160 are disposed on a top side of the longitudinal booms 131, 133 and a fourth left-right pair of rotors 160 is disposed on the top side of the aft booms 151, 153. A first pair of the three pairs of rotors 160 is disposed forward of the forward wing, and a second pair and a third pair of the three pairs are disposed between the forward wing 122 and the aft wing 124. The rotors 160 face substantially upright (i.e., substantially vertically facing) to provide vertical thrust for takeoff and landing maneuvers. However, each of the rotors 160 may be tilted slightly left or right from vertical to assist with yaw control. In embodiments, the slight left/right tilt is fixed. Other arrangements of the rotors 160 on the booms of aircraft 100 may be employed without departing from the scope hereof.

Each rotor 160 includes an electric motor. In embodiments, electrical energy may be provided to the electric motors via one or more batteries, turbogenerators (e.g., one or more of a turbine, diesel, or gas engine configured to drive electrical generators), or a hydrogen fuel cell, for example. The rotors 160 are configured as fixed orientation rotors (i.e., the rotors are not tiltable) for remaining in the upright (i.e., vertically facing) position.

In certain embodiments, rotors 160 may have a propeller diameter of about 2-meters and a disk loading of about 67-kg/m² to about 110-kg/m². In some embodiments, aircraft 100 operates with only six of eight rotors 160 functioning at a time with a disk loading of at least about 90-kg/m². Additionally, rotors 160 may be configured to operate at about 1800 rotations-per-minute (RPM) to about 2700-RPM in embodiments, depending on power requirements and atmospheric conditions.

Pusher propeller 170 is located on an aft end of the fuselage 110. In embodiments, the pusher propeller 170 is powered by a combustion engine (e.g., a gas-powered engine) and is configured for pushing the aircraft 100 forward primarily during the cruise phase of flight. Alternatively, pusher propeller 170 is powered by a direct-drive turboprop or turboelectric engine (e.g., a turbine/generator/ electric motor combination) or a hydrogen fuel cell. In certain embodiments, pusher propeller 170 has a propeller diameter of about 2-meters.

In embodiments, rotors 160 are each equipped with a locking mechanism configured for locking the rotors 160 to prevent them from spinning during forward flight (e.g., during the cruise phase of flight) when pusher propeller 170 is providing forward power. In embodiments, each locking mechanism is configured to lock each respective rotor in one of two positions such that the propeller blades are aligned in the longitudinal direction while locked in a stationary position. The rotors 160 are maintained in a stationary position via the locking mechanism during at least a portion of the cruise phase of flight. An exemplary locking mechanism for use with rotors 160 is described in U.S. Pat. No. 12,006,989, entitled "Propeller Locking Mechanism," and filed Dec. 6, 2023, the disclosure of which is herein incorporated by reference in its entirety.

A plurality of shock absorbing pegs 180 are disposed on lower side of right and left longitudinal booms 131, 133. The pegs 180 are provided in lieu of wheels and are configured for supporting the aircraft 100 on the ground and each include one or more shock absorbers or oleo struts for helping to control landing of the aircraft 100 by absorbing impact during vertical landing maneuvers. In embodiments, each of the right and left longitudinal booms 131, 133 comprises a pair of shock absorbing pegs 180. In certain embodiments, an aerodynamic fairing is provided to cover each of the pegs 180 for reducing drag during the cruise phase of flight.

A ventral fin 190 is disposed on a bottom side of the fuselage 110 at an aft end of the fuselage. Ventral fin 190 is configured to assist with directional stability. In embodiments, ventral fin 190 is fixed and comprises a substantially flat surface.

A plurality of control surfaces may be disposed on the forward wing 122 and aft wing 124. For example, a forward-right control surface 191 and a forward-left control surface 192 are provided on the trailing edge of forward wing 122; similarly, an aft-right control surface 193 and an aft-left control surface 194 are provided on the trailing edge of aft wing 124. The control surfaces 191-194 are configured to operate in conjunction for controlling pitch and roll of aircraft 100. In embodiments, if any one of the control surfaces 191-194 is jammed in any normally encountered position, the three remaining control surfaces may be trimmed to maintain pitch and roll control of aircraft 100.

In embodiments, aircraft 100 is configured to provide a maximum takeoff weight (MTOW) of about 1700-kg, a cruising speed of about 80-knots equivalent airspeed (EAS) to about 100-knots EAS, a nominal range of about 300-km and a maximum range of up to 1500-km. For a 300-km flight, the nominal flight time is about 4-hours and for the maximum range the flight time is about 9-hours. The longer flight time may be achieved by installing additional fuel tanks in the cargo bay, trading payload capacity for additional fuel to provide increased range.

Features described above as well as those claimed below may be combined in various ways without departing from the scope hereof. The following clauses illustrate some possible, non-limiting combinations:

Clause 1. A vertical takeoff and landing (VTOL) aircraft, comprising: a maximum takeoff weight (MTOW) of about 1700-kg; a cruising speed of about 80-knots equivalent airspeed (EAS) to about 100-knots EAS; a nominal range of about 300-km; a nominal flight time of about 4-hours; and at least one pair of rotors configured to provide vertical thrust, wherein each rotor of the at least one pair comprises: a about 2-meter propeller diameter; a disk loading of about 67-kg/m$^2$ to about 110-kg/m$^2$; and an operating speed of about 1800 rotations-per-minute (RPM) to about 2700-RPM.

Clause 2. The VTOL aircraft of clause 1 comprising a forward wing configured to provide a wing loading of about 44-kg/m$^2$ to about 68-kg/m$^2$ during level-steady flight.

Clause 3. The VTOL aircraft of clause 1 comprising an aft wing configured to provide a wing loading of about 48-kg/m$^2$ to about 70-kg/m$^2$ during level-steady flight.

Clause 4. The VTOL aircraft of clause 1 comprising a maximum range of up to about 1500-km.

Clause 5. The VTOL aircraft of clause 1 comprising a maximum flight time of up to about 9-hours.

Clause 6. The VTOL aircraft of clause 1, wherein a disk loading is at least about 90-kg/m$^2$ when six rotors are functioning at a time.

Clause 7. The VTOL aircraft of clause 1, wherein the at least one pair of rotors each comprise an electric motor.

Clause 8. The VTOL aircraft of clause 1 comprising a pusher propeller, wherein the pusher propeller has a propeller diameter of about 2-meters.

Clause 9. A method of operating a vertical takeoff and landing (VTOL) aircraft, comprising: providing vertical thrust during lift off with at least one pair of rotors, comprising: rotating the at least one pair of rotors at a speed of about 1800 rotations-per-minute (RPM) to about 2700-RPM; and operating the at least one pair of rotors with a disk loading of about 67-kg/m$^2$ to about 110-kg/m$^2$; lifting off with a takeoff weight less than a maximum takeoff weight (MTOW) of about 1700-kg; and cruising with a speed of about 80-knots equivalent airspeed (EAS) to about 100-knots EAS.

Clause 10. The method of clause 9 comprising cruising with a forward wing loading of about 44-kg/m$^2$ to about 68-kg/m$^2$.

Clause 11. The method of clause 9 comprising cruising with an aft wing loading of about 48-kg/m$^2$ to about 70-kg/m$^2$.

Clause 12. The method of clause 9 comprising operating three pairs of rotors with a disk loading of at least about 90-kg/m$^2$.

Clause 13. The method of clause 9, wherein cruising comprises propelling forward using a pusher propeller.

Clause 14. The method of clause 13 comprising powering the pusher propeller via a combustion engine.

Clause 15. The method of clause 9 comprising landing on the ground vertically during a landing phase of flight via the at least one pair of rotors.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A vertical takeoff and landing (VTOL) aircraft, comprising:
   a fuselage aligned longitudinally;
   a forward wing that extends laterally across a bottom portion of the fuselage;
   an aft wing that extends laterally across an upper portion of the fuselage;
   a right longitudinal boom that extends longitudinally outboard of a right side of the fuselage beneath the forward wing and the aft wing;
   a left longitudinal boom that extends longitudinally outboard of a left side of the fuselage beneath the forward wing and the aft wing;
   a right tail that extends vertically upwards from the right longitudinal boom to the aft wing;
   a left tail that extends vertically upwards from the left longitudinal boom to the aft wing;
   a maximum takeoff weight (MTOW) of about 1700-kg, wherein the VTOL aircraft is capable of
   flying at about 80-knots equivalent airspeed (EAS) to about 100-knots EAS during a cruise phase of flight, flying for a range of about 300-km, and flying for a flight time of about 4-hours; and
   at least one pair of rotors configured to provide vertical thrust and mounted on top of the pair of longitudinal booms, respectively, wherein each rotor of the at least one pair comprises:
   an about 2-meter propeller diameter;
   a disk loading of about 67-kg/m$^2$ to about 110-kg/m$^2$; and
   an operating speed of about 1800 rotations-per-minute (RPM) to about 2700-RPM; and
   a pusher propeller located on an aft end of the fuselage, wherein the pusher propeller is configured for pushing the aircraft forward during forward flight.

2. The VTOL aircraft of claim 1 comprising a forward wing configured to provide a wing loading of about 44-kg/m$^2$ to about 68-kg/m$^2$ during level-steady flight.

3. The VTOL aircraft of claim 1 comprising an aft wing configured to provide a wing loading of about 48-kg/m$^2$ to about 70-kg/m$^2$ during level-steady flight.

4. The VTOL aircraft of claim 1, wherein the aircraft is capable of flying a maximum range of up to about 1500-km.

5. The VTOL aircraft of claim 1, wherein the aircraft is capable of flying for a maximum flight time of up to about 9-hours.

6. The VTOL aircraft of claim 1, wherein a disk loading is at least about 90-kg/m² when six rotors are functioning at a time.

7. The VTOL aircraft of claim 1, wherein the at least one pair of rotors each comprise an electric motor.

8. The VTOL aircraft of claim 1, wherein the pusher propeller has a propeller diameter of about 2-meters.

9. The VTOL aircraft of claim 1, comprising a pair of aft booms each extending aft from a respective tail of the pair of tails and aft of the aft wing.

10. The VTOL aircraft of claim 9, comprising a pair of aft tail stabilizers, each extending upwards from and operatively coupled to one of the pair of aft booms, respectively.

11. The VTOL aircraft of claim 9, comprising an aft pair of rotors configured to provide vertical thrust, wherein each of the aft pair of rotors is mounted on top of one of the pair of aft booms, respectively.

12. A method of operating a vertical takeoff and landing (VTOL) aircraft, comprising:
providing vertical thrust during lift off with at least one pair of rotors, comprising:
rotating the at least one pair of rotors at a speed of 1800 rotations-per-minute (RPM) to 2700-RPM; and
operating the at least one pair of rotors with a disk loading of 67-kg/m2 to 110-kg/m2;
lifting off with a takeoff weight less than a maximum takeoff weight (MTOW) of 1700-kg; and
flying during a cruise phase of flight with a speed of 80-knots equivalent airspeed (EAS) to 100-knots EAS, a forward wing loading of 44-kg/m2 to 68-kg/m2, and an aft wing loading of 48-kg/m2 to 70-kg/m2;
wherein the VTOL aircraft comprises:
a fuselage aligned longitudinally;
a forward wing that extends laterally across a bottom portion of the fuselage;
an aft wing that extends laterally across an upper portion of the fuselage;
a right longitudinal boom that extends longitudinally outboard of a right side of the fuselage beneath the forward wing and the aft wing;
a left longitudinal boom that extends longitudinally outboard of a left side of the fuselage beneath the forward wing and the aft wing;
a right tail that extends vertically upwards from the right longitudinal boom to the aft wing;
a left tail that extends vertically upwards from the left longitudinal boom to the aft wing; and
a pusher propeller located on an aft end of the fuselage, wherein the pusher propeller is configured for pushing the aircraft forward during forward flight; and
wherein the at least one pair of rotors are mounted on top the longitudinal booms.

13. The method of claim 12 comprising operating three pairs of rotors with a disk loading of at least 90-kg/m².

14. The method of claim 12, wherein flying comprises propelling forward using a pusher propeller.

15. The method of claim 14 comprising powering the pusher propeller via a combustion engine.

16. The method of claim 12 comprising landing on the ground vertically during a landing phase of flight via the at least one pair of rotors.

* * * * *